(No Model.)  5 Sheets—Sheet 2.

G. A. FARRALL.
GRAIN HARVESTER.

No. 603,759. Patented May 10, 1898.

Witnesses:
Henry L. Deck.
Chas. F. Burkhardt.

George A. Farrall, Inventor.
By Wilhelm & Bonner
Attorneys.

THE NORRIS PETERS CO., PHOTO-LITHO., WASHINGTON, D. C.

(No Model.) 5 Sheets—Sheet 3.

G. A. FARRALL.
GRAIN HARVESTER.

No. 603,759. Patented May 10, 1898.

Witnesses:
Henry L. Deck.
Chas. F. Burkhardt.

George A. Farrall, Inventor.
By Wilhelm & Bonner,
Attorneys.

(No Model.) 5 Sheets—Sheet 4.
G. A. FARRALL.
GRAIN HARVESTER.
No. 603,759. Patented May 10, 1898.
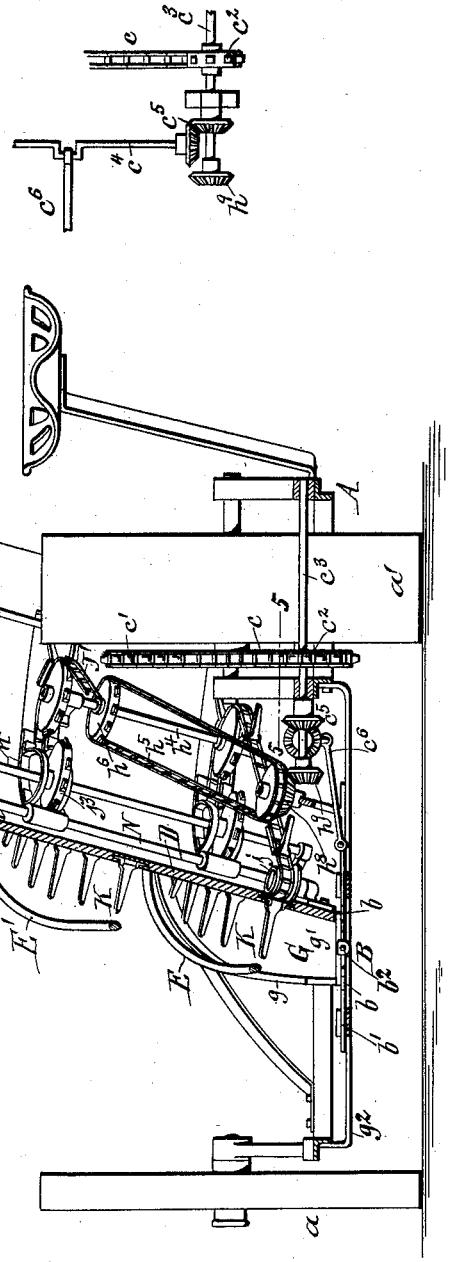
Witnesses:
Henry L. Deck.
Chas. F. Burkhardt.
George A. Farrall, Inventor.
By Wilhelm & Bonner,
Attorneys.

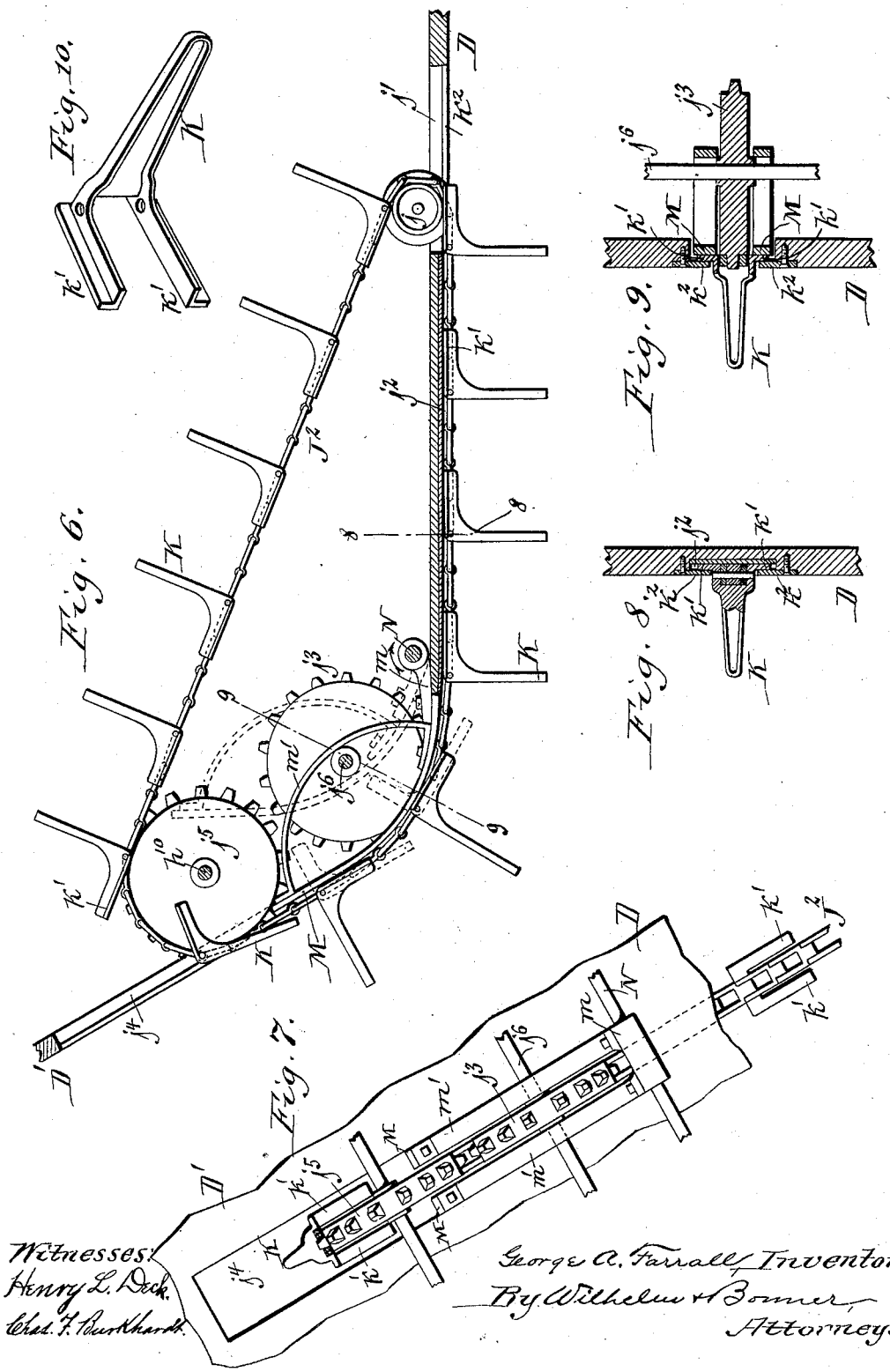

UNITED STATES PATENT OFFICE.

GEORGE ALBERT FARRALL, OF BATAVIA, NEW YORK, ASSIGNOR TO THE JOHNSTON HARVESTER COMPANY, OF SAME PLACE.

GRAIN-HARVESTER.

SPECIFICATION forming part of Letters Patent No. 603,759, dated May 10, 1898.

Application filed November 16, 1897. Serial No. 658,726. (No model.)

*To all whom it may concern:*

Be it known that I, GEORGE ALBERT FARRALL, a citizen of the United States, residing at Batavia, in the county of Genesee and State of New York, have invented new and useful Improvements in Grain-Harvesters, of which the following is a specification.

This invention relates to a machine which is more particularly designed for harvesting corn or maize, although parts of my invention are also applicable to machines for harvesting other grains.

The object of my invention is the production of a comparatively simple harvester for this purpose in which the stalks are carried through the machine in a compact mass and with comparatively small expenditure of power and in which part of the weight of the stalks is utilized to balance the machine and to increase the traction of the driving or master wheel.

Figure 1:
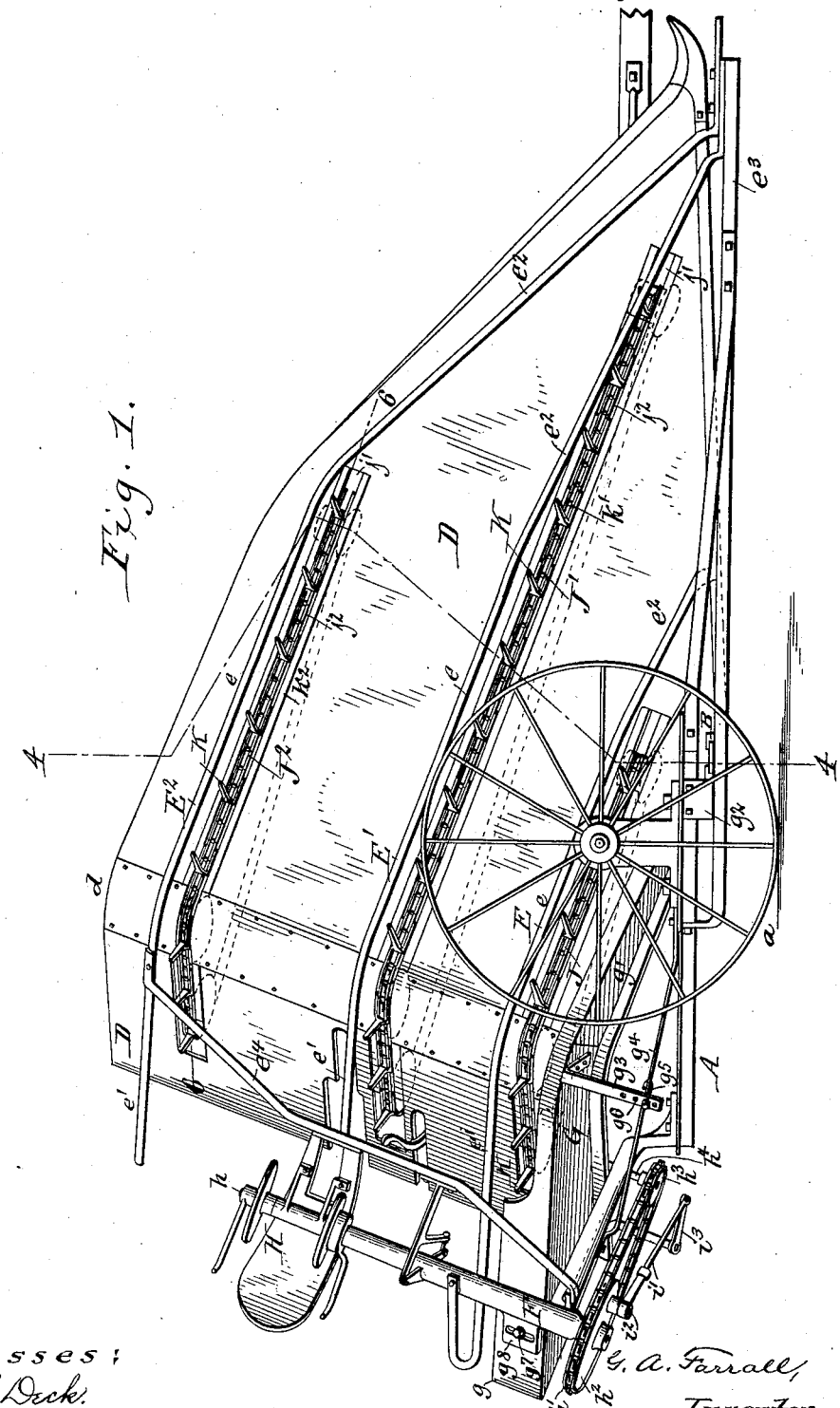
Figure 2:
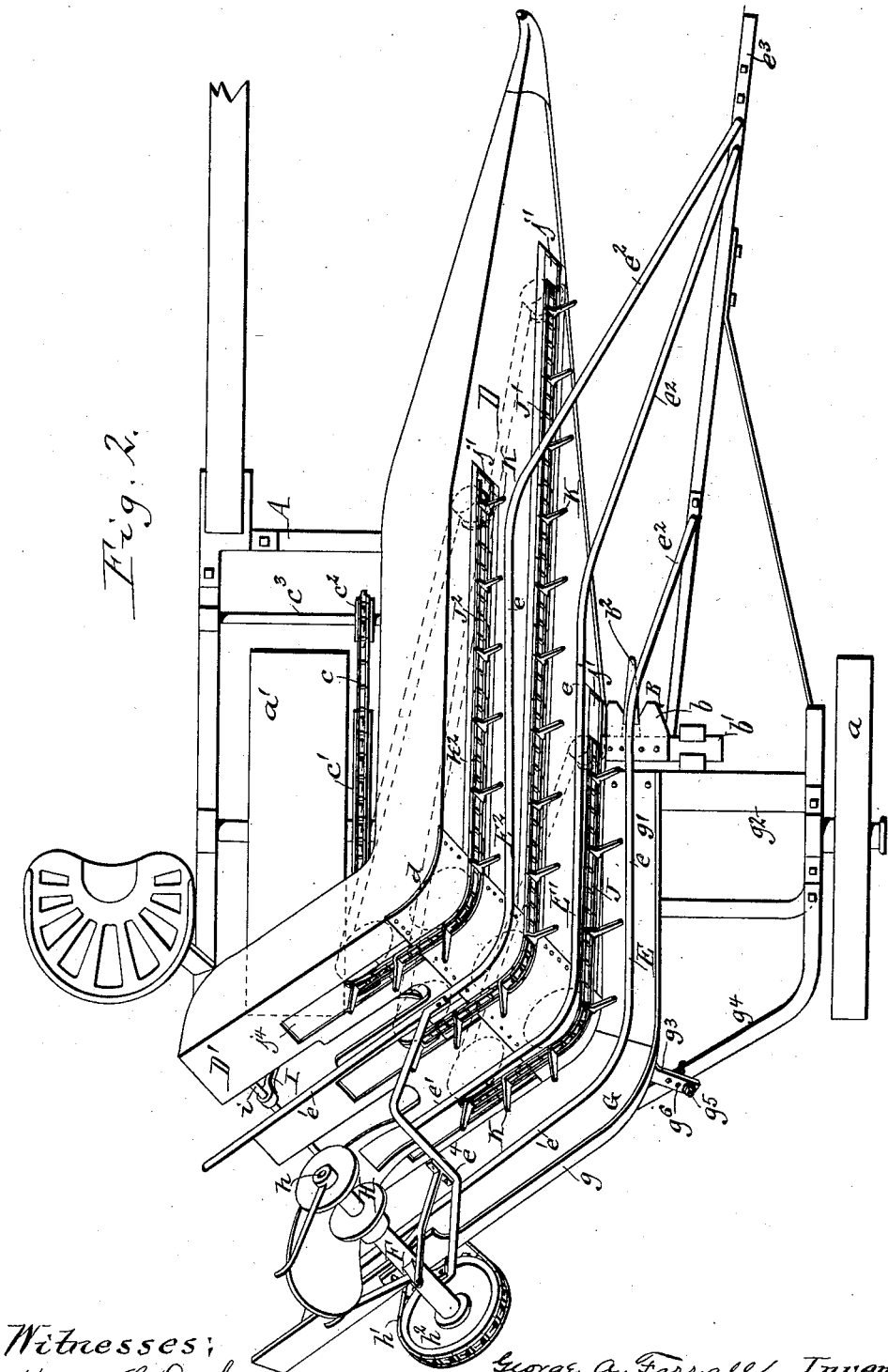
Figure 3:
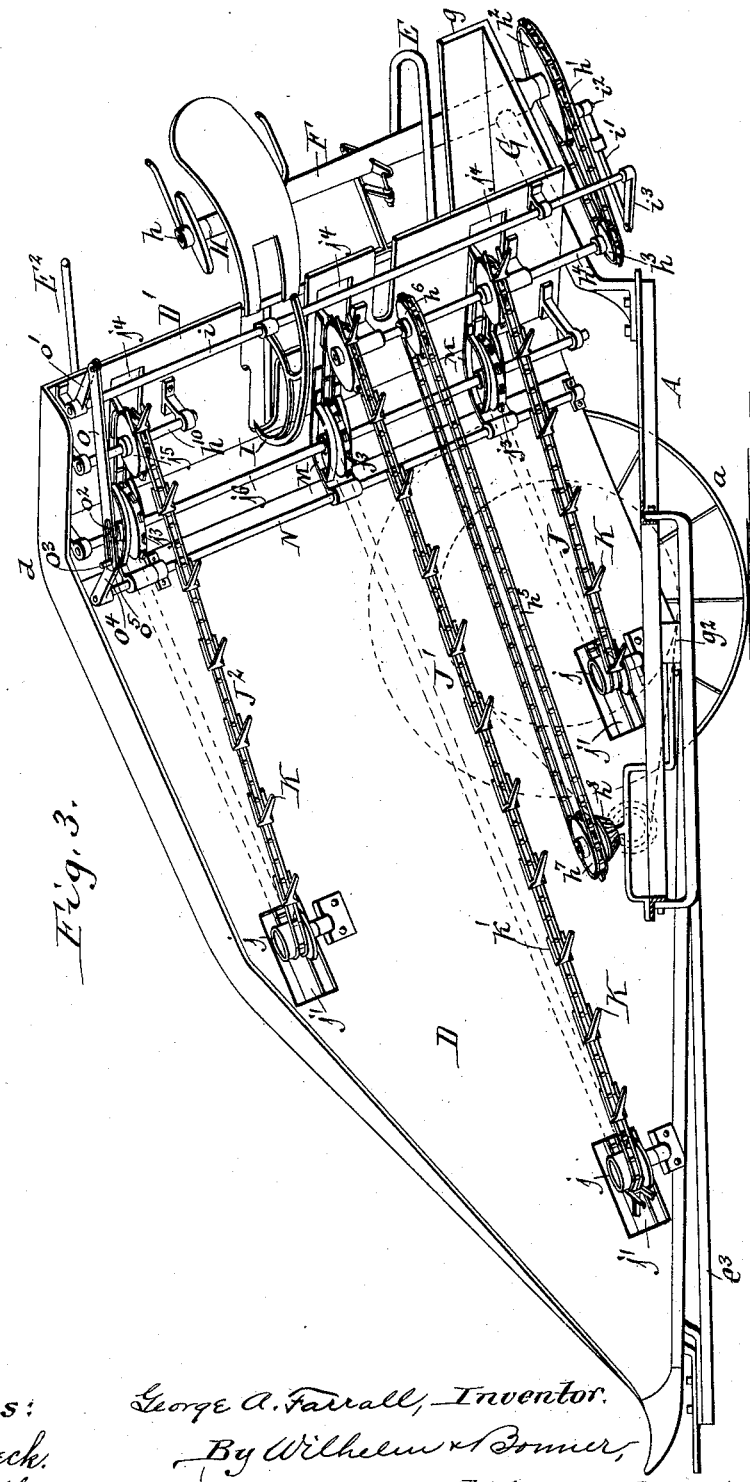

In the accompanying drawings, consisting of five sheets, Figure 1 is a side elevation of my improved harvester viewed from the grainward side. Fig. 2 is a top plan view of the same. Fig. 3 is a sectional side elevation of the harvester viewed from the stubbleward side. Fig. 4 is a vertical cross-section in line 4 4, Fig. 1. Fig. 5 is a fragmentary horizontal section in line 5 5, Fig. 4. Fig. 6 is a fragmentary horizontal section, on an enlarged scale, in line 6 6, Fig. 1, showing one of the conveyer-belts and adjacent parts. Fig. 7 is a fragmentary elevation of the same viewed from the stubbleward side of the machine. Figs. 8 and 9 are vertical transverse sections, on an enlarged scale, in lines 8 8 and 9 9, Fig. 6, respectively. Fig. 10 is a perspective view of one of the feeding teeth or fingers.

Like letters of reference refer to like parts in the several figures.

A represents the main frame of the harvester, which is supported on the grainward side by a supporting-wheel $a$ and on its stubbleward side by a driving or master wheel $a'$.

B represents the cutter, which is arranged on the lower portion of the main frame in front of the axes of the supporting and driving wheels, and which consists, preferably, of one or more movable blades $b$, secured to a transversely-reciprocating cutter-bar $b'$ and operating in conjunction with an ordinary guard $b^2$. The movable blades may be operated from the driving-wheel by any suitable means—for instance, as shown in Figs. 4 and 5, by a chain belt $c$, passing around a large sprocket-wheel $c'$, secured to the axle of the driving-wheel, and a small sprocket-wheel $c^2$, secured to a transverse shaft $c^3$, arranged in front of the driving-wheel, and a longitudinal crank-shaft $c^4$, driven from the transverse shaft $c^3$ by intermeshing gear-wheels $c^5$ and having its crank connected by a pitman $c^6$ with the cutter-bar.

D represents the conveyer-platform, which is arranged lengthwise on the main frame, with its lower portion adjacent to the stubbleward side of the cutter, and which leans laterally toward the driving-wheel, so that the grainward bearing-surface of the platform faces slightly upward. The platform is arranged partly in front and partly in rear of the axes of the supporting and driving wheels and slopes downwardly from its wide rear portion toward its tapering front portion.

D' represents the binder-deck, which is arranged at an angle to the platform, so as to extend rearwardly and stubbleward from the rear end of the platform, the corner at the junction of the platform and binder-deck being rounded, as shown at $d$. The binder-deck, as shown, leans stubbleward at the same angle as the platform and also forwardly toward the axes of the supporting and driving wheels, so that its bearing-surface faces partly upward, rearward, and grainward.

The platform and deck constitute the stubbleward side of the throat or passage through which the stalks pass during the operations of gathering, cutting, conveying, binding, and discharging. The grainward side of this throat or passage consists principally of three guide-bars E E' E². The intermediate and rear portions $e$ $e'$ of these bars follow substantially the contour of the adjacent portions of the platform and deck, while their front portions $e^2$ are bent downwardly and grainward and are secured to a horizontal gathering-bar $e^3$, which projects forwardly from the frame on the grainward side of the cutter. The gathering-bar $e^3$ and the front portions $e^2$ of the guide-bars, together with the opposing portion of the platform, form a gathering-mouth, which converges rearwardly and upwardly and whereby the stalks are gathered and directed toward the platform and the cutter. The intermediate and rear portions of the guide-bars recede gradually from the opposing portions of the platform and deck, so that the sides of these portions of the throat or passage diverge rearwardly, as shown in Figs. 2 and 4, thereby permitting the stalks to spread slightly and preventing choking of the throat. The rear portions of the guide-bars are connected by a cross-bar $e^4$ to a standard F, which supports the knotter mechanism and which is arranged in rear of the binder-deck.

G represents the bottom of the throat, upon which the butt-ends of the stalks rest as they pass through the throat. This bottom extends from the rear side of the cutter along the lower portions of the platform and the binder-deck and bears loosely with its inner or stubbleward edge against the platform and deck, while its outer or grainward edge is provided with an upwardly-projecting guard rail or rim $g$, which confines the butts of the stalks on the bottom. The bottom of the throat is capable of vertical adjustment to suit different lengths of stalks. For this purpose the front end of the bottom may be constructed of a sheet-metal section $g'$, Figs. 1 and 2, which is secured to a cross-bar $g^2$ of the frame and serves as a hinge, while the intermediate portion of the bottom is provided with a depending arm $g^3$, which is adjustably secured to the adjacent bar $g^4$ of the frame by a bolt $g^5$, passing through one of a vertical row of openings $g^6$ in the depending bar, and the rear portion of the bottom is adjustably connected with the standard F by a bolt $g^7$, passing through the rail of the bottom, and a vertically-slotted lug $g^8$ on the standard.

H represents the cams of the knotter mechanism, which mechanism is part of the binding mechanism arranged on the grainward side of the throat opposite the central portion of the binder-deck and driven by an inclined knotter-shaft $h$, which is journaled in the standard F. The knotter-shaft is driven by a chain belt $h'$, passing around a sprocket-wheel $h^2$ on the lower end of the knotter-shaft and a sprocket-wheel $h^3$ on the inclined shaft $h^4$, journaled on the under side of the deck, a chain belt $h^5$ passing around a rear sprocket-wheel $h^6$, secured to the shaft $h^4$, and a front sprocket-wheel $h^7$ and intermeshing bevel gear-wheels $h^8$ $h^9$, secured, respectively, to the front sprocket-wheel $h^7$ and the transverse shaft $c^3$.

I represents the binder-needle, which is arranged on the stubbleward or under side of the deck and which passes through a slot in the deck and coöperates with the knotter at intervals in the usual manner for tying a band of twine around the bundle of stalks. The needle is secured to an inclined rock-shaft $i$, which is journaled on the under side of the delivery portion of the deck and which is operated by a rod $i'$, connected at one end to a crank-pin $i^2$ on the sprocket-wheel of the knotter-shaft and with its other end to a rock-arm $i^3$, which is secured to the lower end of the needle rock-shaft.

J J' J² represent conveyer or feed belts whereby the stalks are carried through the throat to the binder mechanism. These belts are arranged lengthwise of the platform and deck, respectively opposite the lower, intermediate, and upper guide-bars E E' E², and each belt passes with its receiving portion around a guide-roller $j$, thence through an opening $j'$ in the platform and rearwardly through a guide-groove $j^2$ in the upper or bearing side of the platform, thence rearwardly and stubbleward around a sprocket-wheel $j^3$, thence forwardly through a slot $j^4$ in the deck and around a sprocket-wheel $j^5$ to the place of beginning. Each of the guide-rollers is journaled in a bracket secured to the platform.

The intermediate sprocket-wheels $j^3$ of the several feed-belts are secured to a shaft $j^6$, arranged underneath the curved portion connecting the platform and deck, and project through the slots $j^4$. The rear sprocket-wheels $j^5$ of the several feed-belts are arranged underneath the middle portion of the deck and project also through the slots $j^4$. The rear sprocket-wheels $j^5$ of the lower and intermediate feed-belts are secured to the inclined shaft $h^4$, and the rear sprocket-wheel $j^5$ of the upper feed-belt is secured to a separate inclined shaft $h^{10}$, which is arranged axially in line with the lower shaft $h^4$. The space between the lower and upper shafts $h^4$ $h^{10}$ is required for the accommodation of the needle when the latter is retracted.

Each of the feed-belts is provided with a number of feeding-teeth K, which engage with the stalks and carry the same rearwardly through the throat. These teeth are arranged at suitable intervals on the feeding-belts and project laterally or grainwardly from the belts when in their operative position. The inner end of each feeding-tooth is bifurcated and straddles the feed-belt to which the tooth is pivoted on the pintle which connects two of the belt-links. Each of the feeding-teeth is held in an operative position while moving along the platform by two guide-shoes $k'$ $k'$, which project backwardly or at right angles to the body of the tooth from the inner bifurcated portion of the tooth on opposite sides of the feed-belt and which bear against the bottom of the groove $j^2$ in the platform. The shoes bearing against the guide-groove hold the teeth in an operative position or at right angles to the platform, in which position the teeth carry the stalks through the throat. The teeth are prevented from being tipped forwardly while traveling over the platform by retaining bars or plates $k^2$ $k^2$, which are secured lengthwise to the platform along both sides of the guide-groove and overhang the latter and the shoes of the teeth, thereby preventing the shoes from leaving the guide-groove. A single guide-shoe may be used on each tooth instead of two shoes, as shown.

In order to regulate the feeding of the stalks in such manner as to secure a full feeding action on the binder-deck while the binding mechanism receives the stalks for a bundle and to reduce the feeding action on the binder-deck while the binding mechanism is tying the bundle, the following mechanism is provided:

M M represent movable guide-bars, which are arranged on opposite sides of the feed-belts in the openings or slots $j^4$ in the deck and which extend from the curved corner at the junction of the platform and deck rearwardly to the rearmost sprocket-wheels $j^5$. The guide-bars are arranged in pairs on opposite sides of each belt when two shoes are used on each tooth. The bars of each pair are connected at the front ends of the bars to an arm $m$, which is secured to an inclined rock-shaft N, arranged underneath the platform. Each guide-bar is preferably stiffened by a curved or arched brace $m'$, secured longitudinally to the rear side of the bar. When these guide-bars stand in their outermost position adjacent to the feed-belt, the shoes of the feeding-teeth are supported by the bars and hold the teeth in their operative position or at right angles to the deck, as represented in full lines in Fig. 6. Upon shifting the guide-bars inwardly away from the feed-belt the shoes of the feeding-teeth are unsupported as they pass along the deck, which causes the teeth as they press against the stalks to be turned or folded backward until they lie on the feed-belt, as shown in dotted lines, Fig. 6, in which position the teeth are inoperative and do not feed the stalks along the binder-deck to the binder mechanism. The rock-shaft N, which supports the several pairs of guide-bars adjacent to their feed-belts, is operated by a rod $o$, connected at one end with an arm $o'$ on the needle rock-shaft and provided at its opposite end with a longitudinal slot $o^2$, which receives a pin $o^3$, arranged on an arm $o^4$, secured to the rock-shaft N, as shown in Figs. 3 and 4. When the needle is retracted, the connecting-rod $o$ engages with the front end $o^5$ of its slot against the pin $o^3$ of the rock-arm $o^4$ and turns the rock-shaft N, so that the guide-bars are projected and the feeding-teeth are held in an operative position. When the needle moves across the throat for binding the bundle which has accumulated on the binder-deck, the connecting-rod $o$, during the first portion of the forward movement of the needle, releases the rock-arm $o^4$ of the shaft N and permits the pressure of the corn against the feeding-teeth to tilt the latter backward into an inoperative position, during which movement of the teeth their shoes depress the guide-bars and rock the shaft N in the direction of the arrow, Fig. 6. During the last portion of the forward movement of the needle and after the guide-bars have been fully retracted the front end of the slot in the connecting-rod leaves the pin $o^3$ and the rod completes its movement in the same direction independent of the teeth-retaining devices and without further moving the guide-bars. During the first portion of the backward movement of the needle the rod $o$ moves independent of the teeth-retaining devices, and during the last portion of its movement in the same direction the front end of the slot in the connecting-rod $o$ engages with the pin $o^3$ and shifts the latter and connecting parts, so that the guide-bars M are projected and the feed-teeth are compelled to move along the binder-deck in an operative position. This means of operating the guide-bars M causes the feeding action of the teeth to be arrested quickly during the first portion of the forward movement of the needle, and it also restores the feeding action of the teeth quickly during the last portion of the backward movement of the needle, thereby avoiding cramping of the needle, which otherwise would be the case if the stalks were fed while the needle is projected. These feeding-teeth do not only serve to convey the stalks to the binder-deck, but they also pack the stalks in forming the bundle, thereby dispensing with the packer-arms ordinarily employed for that purpose. The packer-arms usually employed in grain-binders move across the path of the stalks and so interfere to a considerable extent with the forward movement of the stalks, which movement can only take place freely when the packer-arms and the needle are out of the way of the stalks. As no packer-arms are employed in this mechanism there is no interference with the forward movement of the stalks, which latter are freely moved forward by the feeding-teeth against the compressor, which is of any ordinary construction and not shown in the drawings.

The guide-bars, which engage with the shoes of the teeth and hold the latter in their operative position as the teeth move along the binder-deck, terminate at the rear wheels $j^5$, so that the shoes of the teeth in moving around these wheels and in passing through the slots in the binder-deck to the under side thereof are unsupported. This allows the teeth to fold back upon their belts in passing to the under side of the binder-deck and enables the teeth to withdraw easily from the stalks which have reached the position for bundling. Fig. 6 shows the last tooth on the face of the binder-deck folded back in withdrawing from the stalks. The teeth on the returning side of the belt remain in this folded position to a greater or less extent, but are shown for convenience in a projecting position. These folding teeth can be made comparatively long and of any form which is most suitable for effectively conveying the stalks, as the teeth withdraw readily from the stalks in passing below the binder-deck, which would not be the case if the teeth were rigidly connected with the feed belts or chains.

As the harvester is drawn along the converging front portion of the throat gathers the stalks and directs the same against the platform, so that the teeth of the feed-belts grasp the same. After the feed-belts obtain control of the stalks the latter are severed by the cutter and then carried backward and laterally to the binder mechanism, which ties the stalks into bundles and discharges the same. The feed-belts rise from their receiving portions toward their delivery portions, so that the stalks after they are severed are lifted upon the bottom of the throat. As the stalks are carried along the platform they lean stubbleward, owing to the lateral inclination of the platform in that direction, which causes the stalks to rest against the platform and enables the teeth of the feed-belts to obtain a firm grasp upon the same. By resting the stalks in an inclined position on the platform they are massed more compactly than would be the case if they were arranged vertically, and the increased frictional contact between the stalks and the platform reduces the pressure of the butt-ends of the stalks against the bottom of the throat, thereby reducing the power necessary to feed the stalks and also preventing the butt-ends from being bent, which would be liable to occur if the stalks rested with their full weight on the butts. By inclining the platform toward the stubbleward side of the machine the weight of the stalks is brought to bear principally on the driving-wheel, thereby increasing the traction thereof and relieving the grainward supporting-wheel. The friction of the stalks resting against the inclined bearing-face of the platform retards the downward movement of the stalks after they are cut and so enables the stalks to reach the bottom plate of the throat and find a support thereon before their butt-ends can descend below the level of the cutter mechanism. This permits the use of an ordinary open cutter mechanism and avoids the necessity of using converging stationary knives, which frequently clog up with stalks and ears.

As the stalks are carried along the binder-deck they lean forward, which causes the overhanging weight to be brought nearer the axes of the driving and supporting wheels, thereby preserving the balance of the machine.

The platform and binder-deck and the principal axial lines of the feeding and binding devices are all parallel or at the same angle, which permits the same feeding mechanism to be extended over the platform and the binder-deck and also permits of driving the binder mechanism in the most direct and simple manner.

I claim as my invention—

1. The combination with the cutter and the binder mechanism, of a platform arranged lengthwise with reference to the line of draft and upright but inclining toward the stubbleward side, so that its bearing-surface faces grainward and upward, and a longitudinal conveyer which moves the grain along the inclined face of the platform, substantially as set forth.

2. The combination with the cutter and the binder mechanism, of a platform arranged lengthwise with reference to the line of draft and upright but inclining toward the stubbleward side, so that its bearing-surface faces grainward and upward, a binder-deck extending stubbleward from the rear end of the platform, and a longitudinal conveyer which moves the grain along the bearing-faces of the platform and binder-deck, substantially as set forth.

3. The combination with the cutter and the binder mechanism, of a platform arranged lengthwise with reference to the line of draft and upright but inclining toward the stubbleward side, so that its bearing-surface faces grainward and upward, and a binder-deck extending stubbleward from the rear end of the platform and inclining forwardly, the inclination of the platform and binder-deck being at the same angle, substantially as set forth.

4. The combination with the cutter and the binder mechanism, of a platform arranged lengthwise with reference to the line of draft and upright but inclining toward the stubbleward side, so that its bearing-surface faces grainward and upward, a binder-deck which extends stubbleward from the rear end of the platform, and conveying-belts running rearwardly along the bearing-face of the platform, thence stubbleward along the bearing-face of the deck and thence forwardly to the front end of the platform, substantially as set forth.

5. The combination with the cutter and the binder mechanism, of a platform arranged lengthwise with reference to the line of draft and upright but inclining toward the stubbleward side, so that its bearing-surface faces grainward and upward, a binder-deck extending stubbleward from the rear end of the platform and inclining forwardly, conveyer-belts passing lengthwise of the platform and binder-deck and supported on wheels or rollers, and needle and knotter shafts arranged adjacent to the binder-deck, said platform and binder-deck, the pivots of the conveyer-wheels, and the needle and knotter shafts being arranged at the same angle, substantially as set forth.

6. The combination with the cutter and the binder mechanism, of a platform arranged lengthwise with reference to the line of draft and upright but inclining toward the stubbleward side, so that its bearing-surface faces grainward and upward, and a vertically-adjustable bottom arranged along the lower portion of the platform and adapted to support the butts of the stalks, substantially as set forth.

7. The combination with the cutter and binder mechanism, of a platform arranged lengthwise with reference to the line of draft and upright but inclining toward the stubbleward side, so that its bearing-surface faces grainward and upward, a binder-deck which extends stubbleward from the rear end of the platform, belt conveyers which run rearwardly along the bearing-face of the platform, thence stubbleward along the bearing-face of the deck and thence forwardly to the front end of the platform, and guide-bars which are arranged grainward opposite the belt conveyers, substantially as set forth.

8. The combination with the upright longitudinal platform, the upright binder-deck extending stubbleward from the rear end of the platform and the binder mechanism, of a conveyer-belt arranged lengthwise of the platform and binder-deck and provided with teeth which are pivoted to the conveyer-belt to fold back on the same when unsupported, a tooth-supporting guide arranged in the binder-deck and extending stubbleward from the junction of the platform and binder-deck, said guide being pivoted at its front end and capable of swinging forwardly at its rear end, and connections between said guide and the binder mechanism whereby the guide is swung forwardly to release the teeth when they are not required to feed, substantially as set forth.

9. The combination with the upright longitudinal platform, the upright binder-deck extending stubbleward from the rear end of the platform and the binder mechanism, of a conveyer-belt arranged lengthwise of the platform and binder-deck and provided with teeth which are pivoted to the conveyer-belt to fold back on the same when unsupported, a sprocket-wheel arranged at the junction of the platform and binder-deck and a stubbleward sprocket-wheel arranged in the binder-deck for supporting the rear portion of said conveyer, a tooth-supporting guide pivoted in front of said first-mentioned sprocket and extending toward the stubbleward sprocket-wheel, and connections whereby said guide is shifted from the binder mechanism, substantially as set forth.

10. The combination with the longitudinal platform, the binder-deck extending stubbleward from the rear end of the platform and the binder mechanism, of a conveyer-belt arranged lengthwise of the platform and binder-deck and provided with pivoted feeding-teeth, a rock-shaft arranged near the junction of the platform and binder-deck and provided with a guide-bar adapted to hold the teeth in their operative position in passing along the binder-deck, and a rod attached to an arm on the needle-shaft and having a sliding connection with an arm of said rock-shaft, substantially as set forth.

Witness my hand this 11th day of November, 1897.

GEORGE ALBERT FARRALL.

Witnesses:
GEORGE O. VOLZ,
JOSIAH T. WHITCOMB.